United States Patent
Khan

(10) Patent No.: US 6,631,783 B2
(45) Date of Patent: Oct. 14, 2003

(54) MAPPING RESERVOIR CHARACTERISTICS USING EARTH'S NONLINEARITY AS A SEISMIC ATTRIBUTE

(75) Inventor: Tawassul Ali Khan, Cypress, TX (US)

(73) Assignee: Nonlinear Seismic Imaging, Inc., Houston, TX (US)

( * ) Notice: Subject to any disclaimer, the term of this patent is extended or adjusted under 35 U.S.C. 154(b) by 6 days.

(21) Appl. No.: 09/816,897

(22) Filed: Mar. 26, 2001

(65) Prior Publication Data

US 2002/0134612 A1 Sep. 26, 2002

(51) Int. Cl.$^7$ .............................. G01V 1/00; G01V 1/40; G01V 1/16
(52) U.S. Cl. ........................ 181/108; 181/105; 181/122; 367/38; 367/39; 367/40; 367/41; 367/42; 367/35; 367/32
(58) Field of Search ................................. 181/108, 106, 181/111, 112, 122, 105; 367/41, 49, 32, 38–42, 35; 702/16

(56) References Cited

U.S. PATENT DOCUMENTS

| | | | | |
|---|---|---|---|---|
| 4,641,724 A | * | 2/1987 | Chow et al. ................ | 181/104 |
| 5,719,821 A | * | 2/1998 | Sallas et al. ................ | 324/323 |
| 5,767,680 A | * | 6/1998 | Torres-Verdin et al. ..... | 324/355 |
| 6,009,043 A | * | 12/1999 | Chon et al. .................... | 367/57 |
| 6,152,256 A | * | 11/2000 | Favret et al. ............... | 181/111 |
| 6,366,531 B1 | * | 4/2002 | Varsamis et al. ............. | 367/26 |

* cited by examiner

Primary Examiner—Robert E. Nappi
Assistant Examiner—Edgardo San Martin
(74) Attorney, Agent, or Firm—Tawassul A. Khan; Sofia Khan McGuire; Nonlinear Seismic Imaging, Inc.

(57) ABSTRACT

This invention relates to mapping the hydrocarbon reservoir characteristics by mapping the reservoir formations that display dynamic elastic nonlinearity responses to the seismic signals. The main reason of this nonlinear behavior in the reservoir rocks is their bulk rock property: the porosity, fractures, differential pressure and pore saturation. To map these bulk rock properties, the interaction of the two seismic waves as they propagate through elastically nonlinear rocks is recorded. Two compressional seismic signals are transmitted from the surface. Seismic reflection data using surface or borehole detectors are recorded. One of the transmitted signals is a conventional swept frequency and the other is a mono-frequency signal. During the propagation of these two signals through the elastically nonlinear reservoir rocks, there is an interaction between the two signals. The sum and difference frequencies of the two primary seismic signals that were transmitted from the surface are created. These new frequencies constitute an 'interaction' wave that travels along with the two primary waves. In this invention, the 'interaction' signal created by the two seismic waves as they propagate through the reservoir rocks is separated from the primary signals and used to map the reservoir rocks that exhibit elastic nonlinearity due their bulk rock properties. The cross-correlation of the recorded data with the swept frequency signal provides a conventional seismic data set that is used for normal 2-D or 3-D seismic processing. The cross-correlation of the recorded data with the summed and differenced signals provides two sets of data that represent the seismic reflected image from the subsurface nonlinear formations.

5 Claims, 3 Drawing Sheets

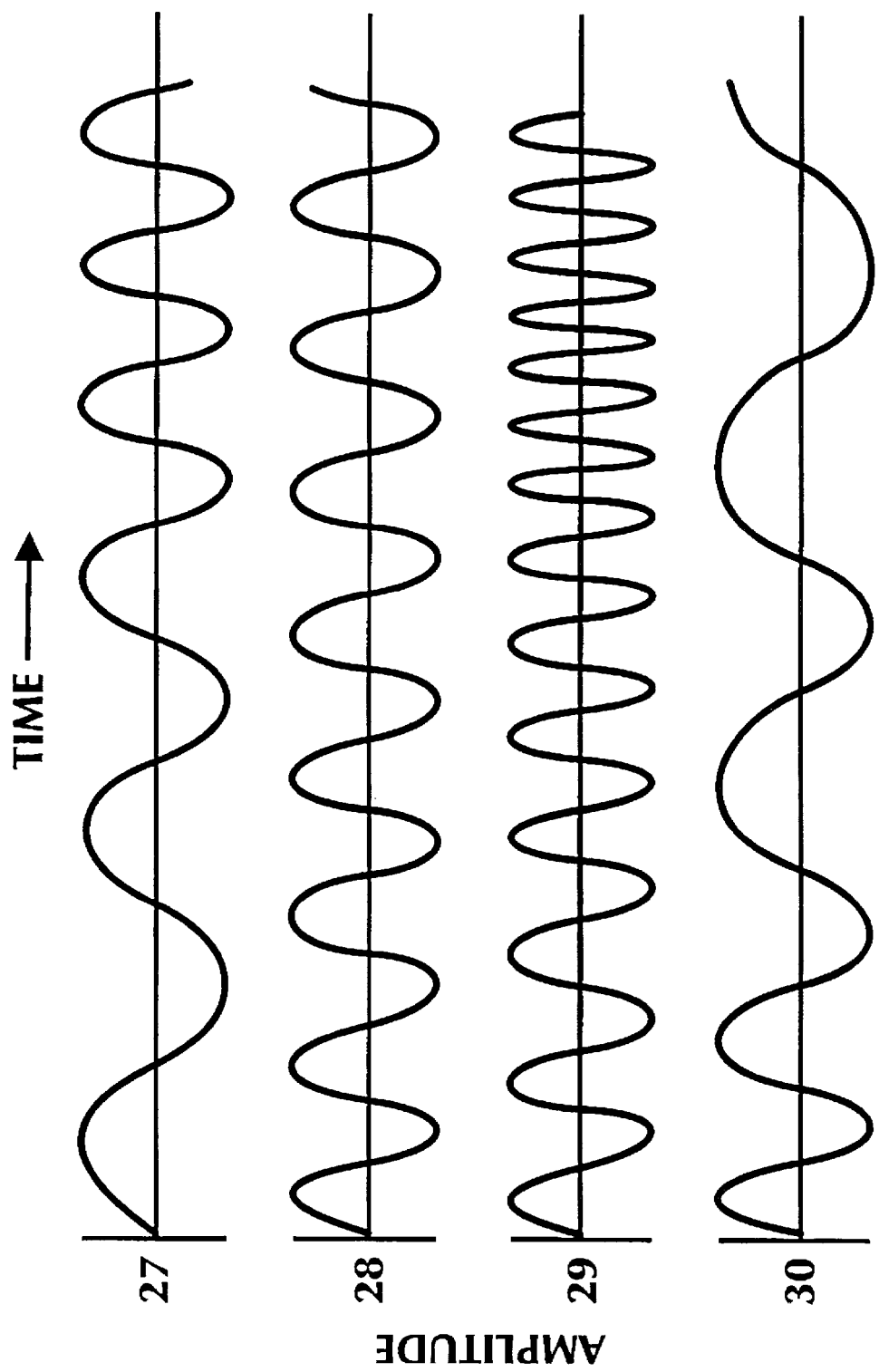

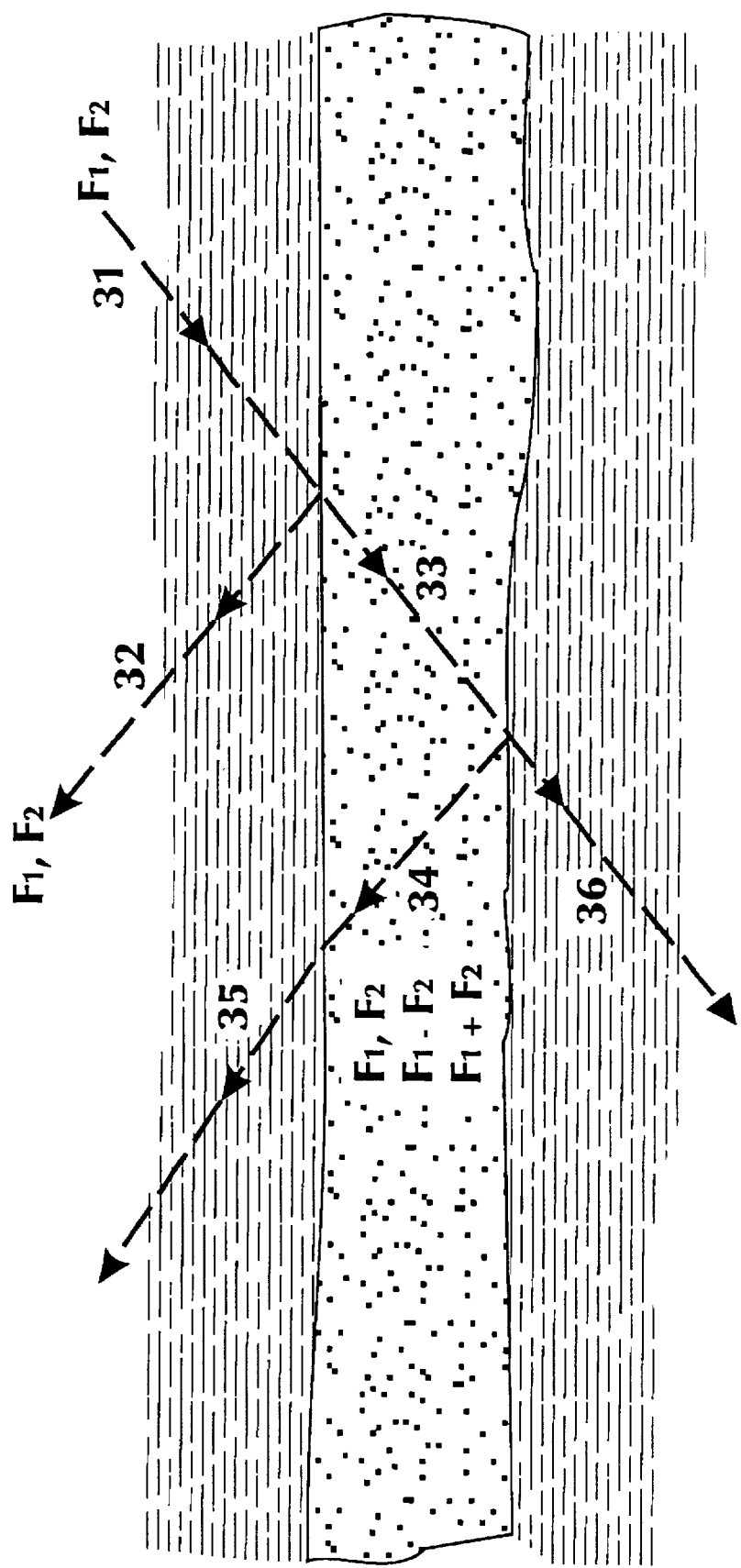

MAPPING RESERVOIR CHARACTERISTICS USING EARTH'S NONLINEARITY AS A SEISMIC ATTRIBUTE

BACKGROUND OF THE INVENTION

1. Field of Invention

The invention is related to mapping the hydrocarbon reservoir formations that display dynamic elastic nonlinearity to the seismic signals, which propagate through them. The main reason for this nonlinear behavior in the reservoir rocks is their bulk rock property: the porosity, fractures, grain-to-grain contacts and the pore fluids. The measurements of the interaction of the two seismic waves as they propagate through the elastically nonlinear formations of a reservoir are used to measure their bulk rock properties.

2. Description of the Prior Art

The current state-of-the-art seismic technologies that are being used to map the reservoir characteristics include 3-D seismic reflection surveys, seismic attribute analysis, signal amplitude extraction and coherency techniques. In spite of all the recent progress in seismic data acquisition and seismic data processing, results are quite often non-unique and ambiguous and fail to identify the higher porosity and fractured zones that contain a major portion of the hydrocarbon reserves.

New technologies and more sensitive methods of measuring the reservoir characteristics have to be developed and introduced to identify and map the higher porosity and fractured reservoir rocks, which may contain unproduced hydrocarbon reserves. In the past, the seismic industry has ignored the effects of elastic dynamic nonlinearity of the reservoir rocks. The measurement of the dynamic elastic nonlinearity of the rock is a sensitive tool because the porosity induces an orders of magnitude change for the nonlinear coefficients and a few percent change for linear parameters (velocity, attenuation etc.). Ref: Donskoy, McKee (1977); Paul Johnson (1997).

The dependence of the dynamic elastic nonlinear parameters of the rock on its bulk porosity and its fluid content has an important practical application. The correlation between the measurable effective nonlinear parameters and the structural parameters of the porous and fractured media can be used as a diagnostic tool for reservoir characterization. The measurement of elastic nonlinearity of the reservoir formations using seismic waves directly correlates with its bulk porosity, micro-fractures and the fluid content.

Two compressional waves, as they propagate through a porous rock that acts as an elastically nonlinear medium, interact with each other. Due to this interaction, the sum and difference frequencies of the two primary waves are created. These new frequencies constitute an 'interaction' wave that travels along with the primary waves. The amplitude of the summed frequencies or the 'interaction' wave is a function of the amplitudes of the two primary waves and the propagation distance through the nonlinear rock. The amplitude of the 'interaction' wave is proportional to the product of the primary wave amplitudes. Its amplitude grows with propagation distance due to nonlinearity and decays with distance due to attenuation. Reference U.S. Pat. No. 6,175,536 (Khan), where the interaction of the two crosswell seismic signals was successfully recorded as they propagate through the nonlinear reservoir formations.

This invention uses the measurement of the summed and differenced frequencies that are created due to the interaction of the two seismic (waves) or signals as they propagate through the porous and heterogeneous reservoir rocks. One of the signals is a vibratory 'sweep' commonly used for seismic recording; the frequency is swept over the seismic band from low to high or high to low over a period of several seconds. The concept is well known in the industry and is the current art.

The second signal is a mono-frequency sinusoidal signal, which has the same time duration as the vibratory sweep. Both the seismic signals or waves are generated, and transmitted using standard vibratory sources from a single source array, that behave as a single surface source location. The combined seismic wave is used for seismic reflection recording. It propagates through the surface formations and is transmitted and reflected at the formation boundaries that provide acoustic impedance contrasts. The reflected seismic signals are recorded using multiple detector arrays, located on the surface or in different well bores or both. The recording procedures are known in the current art.

In this invention, the interaction of the two-seismic waves as they propagate through the reservoir rocks is measured to map their nonlinear characteristics that correspond due to their bulk porosity, heterogeneity, and fluid contents. The data, which are recorded, have two different sets of information. The cross-correlation with the standard 'sweep' provides the normal data-set that is used for normal reflection processing similar to current 2-D and 3-D seismic processing that is universally practiced and known in the art. The second set of information is extracted, by generating two new sweep signals. These new signals are generated by adding and differencing the mono-frequency with the 'sweep' frequencies, thus providing two 'modified-sweeps' and cross-correlating the recorded data with these 'modified-sweeps'.

This new set of data, which results after cross-correlation with the two 'modified-sweeps' and contains newly generated frequencies, represents the result of interaction between the mono-frequency wave and the 'sweep' frequency wave, as they propagate through the nonlinear reservoir rocks. The processing parameters for this new data-set are similar to the parameters used for the data generated after cross-correlation with the primary 'sweep' signal. Conventional 2-D and 3-D seismic processing sequence can be used for both sets of data to provide the reflection seismic image of the subsurface. The integration and interpretation of the two results, one based on the primary sweep, and the other based on the two modified-sweeps, highlights and identifies the subsurface formations that are nonlinear due to porosity, microfractures and fluid saturation. The results based on the two 'modified-sweeps' will display the reflected signals from higher porosity and micro-fractured formations at relatively higher amplitudes compared to the reflections from homogeneous and non-porous formations.

The unique contribution of this invention is that it provides a method of differential illumination of the subsurface formations that are of greater interest to the hydrocarbon producers. Clays and shales are normally less porous, more homogeneous and behave more linearly in comparison with high porosity sandstones and limestones. As a result, shales and clays generate a weaker 'interaction' signal and will show less prominent response on the nonlinearity seismic section.

The seismic results based on the second data-set that are produced after correlation with the two 'modified-sweeps' identify and high light the zones that have higher nonlinearity due to higher porosity, microfractures or their fluid content, thus identifying the formations that have greater potential for increasing the hydrocarbon reserves.

SUMMARY OF INVENTION

Briefly, the present invention provides a new and improved method of mapping the subsurface formations that are heterogeneous, that have higher porosity or that have fractures. Two surface vibratory sources are used: (a) One surface source that transmits a conventional sweep, where the frequencies in the seismic bandwidth are swept from low to high or high to low; and (b) the other surface source generates a mono-frequency sinusoidal signal that is predetermined. Both sources transmit their signals from the same source location, and their start timings are synchronized.

The simultaneous transmission of the mono-frequency and the swept signal generates a combination of two waves that travel through the earth formations, and are reflected and refracted from the acoustic boundaries as they propagate through the earth. The reflected signals are recorded by the seismic detectors that are located on the surface, ocean bottom, in one or more well bores or any different combinations of above.

Since all earth formations exhibit certain amount of elastic nonlinearity, the two seismic signals (waves) interact with each other as they propagate through different formations. The level of interaction between the two seismic waves directly relates to the order of nonlinearity that exists in each subsurface formation.

The degree of elastic nonlinearity in different earth formations changes according to the rock properties, the presence of compliant features, and the pore fluids. The porous rocks and the fractured rocks exhibit a higher order of elastic nonlinearity due to disorganized and larger pore space. Shales and clays, compared to sands, exhibit lower order of nonlinearity since they are more homogeneous and have lower porosity.

The level of interaction between the two seismic waves is greater in higher porosity and micro-fractured rocks. Due to this reason, new frequencies that result from the nonlinear interaction have larger amplitude in higher porosity and micro-fractured rocks compared to non-porous rocks. These new frequencies are generated by a continuous process of summing and differencing, between the two frequencies of the primary signals, as the two signals propagate through nonlinear formations. The interaction of the mono-frequency with the swept frequency signal generates two sets of swept frequencies. One is the result of addition and the other of subtraction; these two new signals can be identified as 'interaction-sweeps' or 'modified sweeps'.

For every set of recording, where both the mono-frequency surface source and the swept frequency source have been activated, three sets of data are collected, processed and interpreted. The first one is the conventional dataset generated by the cross-correlation of the recorded data with the standard swept frequency signal, that is used for the 2-D and 3-D seismic processing, and is well known in the art. The other two data-sets, that result after cross-correlation with the 'modified sweeps' (amended), are unique since they represent newly generated frequencies that have been created due to the nonlinearity of the earth's formations.

CROSS-CORRELATION OF VIBROSEIS DATA

The cross-correlation function is a measure of similarity between two data sets. The corresponding values of the two data sets are multiplied sample by sample and the products summed to give the value of the cross-correlation. Wherever the two signals match, the products are positive and the result of the cross-correlation is very large. However when the two signal do not match and some of the samples are of opposite phase and some in phase with each other, some of the products are negative and some positive, thus reducing the end sum to a much smaller value. For the cross-correlation of the field record, the sweep signal is aligned in time with the field record at zero time, and cross-correlated. After that the sweep is moved in time by one digital sample and the two signals are cross-correlated again. Each cross correlation gives one sample of the cross-correlated result. The process of time shifting the sweep and cross-correlating it with the field record continues until the required length of the cross-correlated field record has been achieved. The process of cross-correlation can also be performed in frequency domain. In frequency domain cross-correlation is equivalent to multiplying the amplitude spectra and subtracting the phase spectra. The process of cross-correlation is a powerful matching-filter and eliminates any signals that do not match the 'sweep' signal. The attenuation of the undesired signals is usually better than−40 Db. (100:1). For this reason, the method described in this Application relies on the process of cross-correlation to totally separate the reflections resulted from the swept frequency 'sweep' signal and the reflections which result from the interaction between the 'sweep' and the 'mono-frequency' signals.

The two new sets of data are processed using similar processing parameters as the conventional 2-D and 3-D seismic reflection data, which is known in the art. These reflection-seismic results, that contain newly generated frequencies, emphasize the presence and locations of the high porosity and fractured formations in comparison with the formations that are non-porous like shales and clays.

SEISMIC REFLECTION DATA PROCESSING

In the real world situation, it is difficult to identify a universal data processing sequence for 2-D or 3-D seismic, since the choice of the data processing parameters depends a great deal on the signal to noise ratio of the recorded data, near surface problems of the survey area, and the velocity model of the subsurface being mapped. The data processing technology has matured to the degree that most data processing centers have the knowledge to process the 2-D or 3-D seismic data, which have been recorded in different geologic environments with similar results. We can say that data processing sequences are readily available in the industry to provide satisfactory results for most of the surface and geologic conditions that we try to image. There is current knowledge in the industry to process the data for the method described in the Application.

During the 50 years of research and development in seismic data processing, a lot of new software routines and processing algorithms have been developed. However in spite of all the progress, the fundamental issues and the goals of seismic data processing have remained the same. The end result of the total seismic effort, acquisition and processing is to develop an accurate geologic model of the subsurface rock formations in true depth, map the rock properties to identify the porosity, permeability and fracturing, and to map the pore fluids that saturate the reservoir rocks. The universal challenges that have faced the industry over this time have also remained the same:

How to improve the signal to noise ratio, so that the reliability of the processed results can be improved.

The 'noise' is defined as any unwanted signal and includes random noise, organized noise, multiples, converted waves etc.

For surface seismic, surface and near surface problems have been a major challenge, which include the coupling response of the sources and receivers, static time corrections due to changes in the thickness and the velocities of the near surface weathering layers, attenuation of higher frequencies; all these factors degrade the data quality and affect the final seismic image. To get an accurate seismic velocity model of the area to be mapped is another challenge, since the depth conversion can only be valid when exact velocities are used during data processing and seismic imaging.

Complex subsurface structures with conflicting dips and abrupt discontinuities make the seismic imaging difficult since the seismic wave paths get distorted.

Anisotropy of the seismic wave field provides additional challenges that data processing has to overcome.

Additional seismic attributes are needed to accurately map the reservoir properties.

For the reasons described above, the processing flow of the seismic data changes according to the geologic objectives. However, the seismic data processing has become a matured science. Most data processing centers around the world have similar capabilities, similar software and processing routines. The data processing has matured to the point that most of the software products have been standardized and practically all the major processing centers can provide very similar seismic images of the subsurface geology.

There are certain important considerations for processing the data recorded according to the method described in the Application:

The interaction-wave, which results due to elastic non-linearity of the porosity in the subsurface rocks, follows the same reflection and refraction laws as the primary 'sweep' signal, as a result the data processing parameters, which are related to static and dynamic corrections, have to be identical for both the data sets.

The data processing sequence and the selection of the processing algorithms is determined by the primary data, which is the result of the cross-correlation with the primary 'sweep' signal. The 'sweep' signal is the signal transmitted by the surface seismic vibrator and acts as a primary source.

During the pre-processing or primary processing sequence, the standard processing routines of spherical divergence correction, attenuation of source generated noise, surface consistent amplitude balancing, de-convolution, etc. are applied.

Velocity analysis is done for determining the seismic velocities for migration or CDP stack.

Surface consistent static corrections applied, followed by residual static corrections.

Post stack or pre-stack migration is performed.

Coherency enhancement applied if necessary.

The processing sequence is repeated for the data generated after cross-correlation with the 'modified sweep' signals, which resulted after the sum and difference of the 'sweep' signal with the mono-frequency signal. The same processing parameters are used, which were derived based on the primary 'sweep' data that include static and dynamic corrections along with other data enhancement routines used previously to process the primary data, which resulted after cross-correlation with the 'modified sweep' signals.

Reflection images of all the three data sets, which result after data processing are used for interpreting the subsurface porosity.

Integration and interpretation of the processed reflection seismic results, based on the three sets of data, provide new and valuable information related to the reservoir and potential hydrocarbon accumulations. Data recorded by the downhole receivers, compared to the surface arrays, offer higher resolution. The higher resolution results due to the fact that the summed frequencies that are generated in the nonlinear reservoir rocks are less attenuated due to shorter return propagation distance.

The choices of applying this invention for reservoir characterization for different reservoirs will differ according to the production objectives and targets. In some areas, surface recording may provide the necessary information needed to map the reservoir characteristics, while in other areas it may be necessary to complement-the surface recorded data with the wellbore receiver data. Knowledge to modify and select the suitable recording and processing parameters for each individual case exists in the industry and is known in the art.

BRIEF DESCRIPTION OF THE DRAWINGS

FIG. 2 is a schematic of the two seismic signals generated at the surface and the result of their interaction as they propagate through an elastically nonlinear medium.

FIG. 3 is a schematic, taken in cross section, of the reflected signals from acoustic impedance boundaries of the two formations: one formation that is linear and the other formation that is elastically nonlinear.

DESCRIPTION OF THE PREFERRED EMBODIMENT

Figure 1:
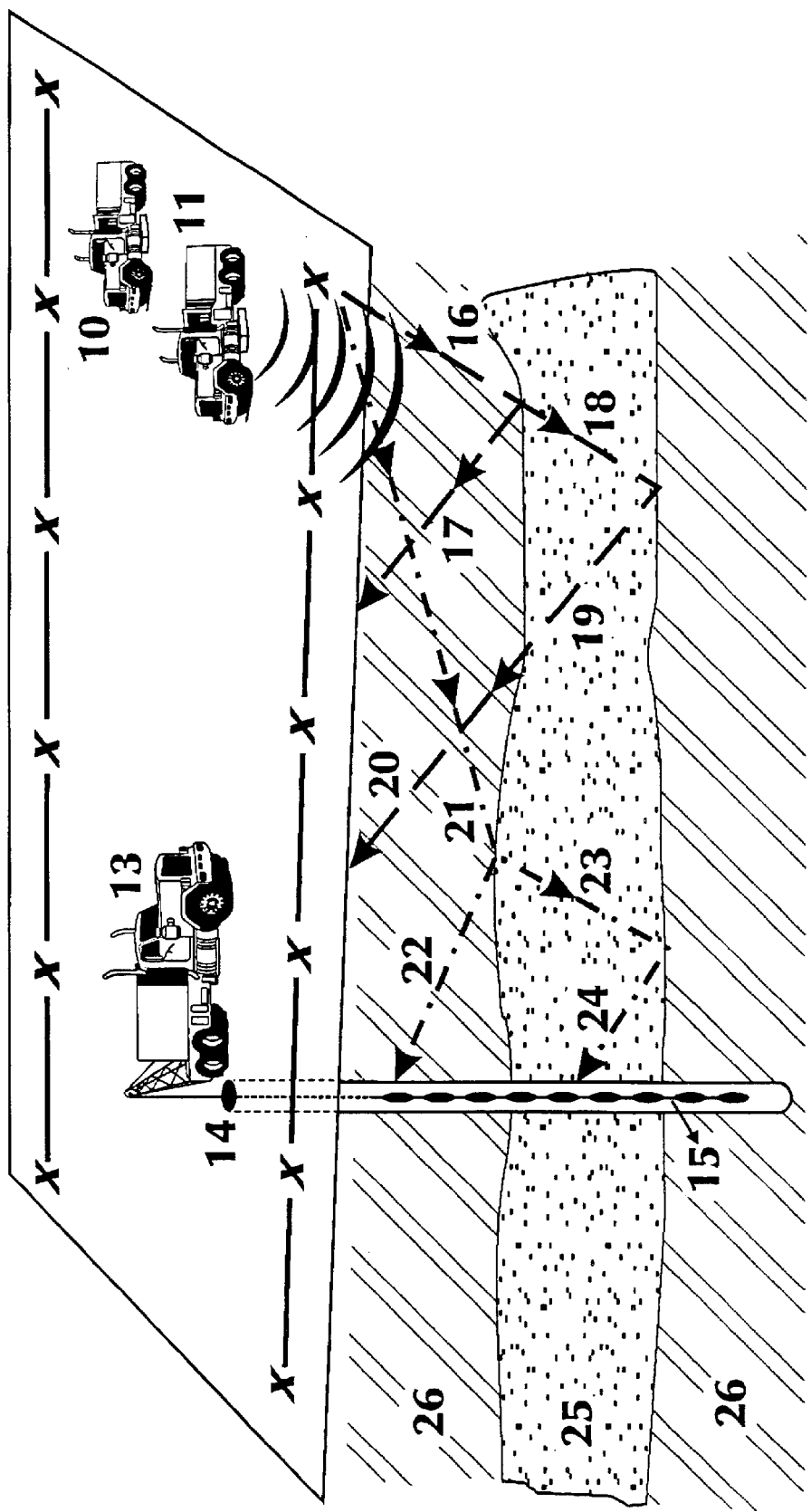
FIG. 1 is a simplified schematic, taken partly in cross section, to illustrate the field data acquisition for this invention.

In the drawings, FIG. 1 schematically illustrates the concept of the field deployment of the seismic equipment and data recording in the field, for mapping the elastic nonlinearity of the subsurface formations. Two vibratory surface sources 10 and 11 are shown, that generate the seismic signal (waves) that penetrate the earth and are reflected from the subsurface acoustic boundaries. The vibrator 10 generates a swept frequency signal that sweeps from 10 Hz to 50 Hz. In practice, any selection of frequencies within the useful seismic bandwidth can be made, and the sweep time can also be adjusted according to the art known in the industry.

The vibrator 11 generates a mono-frequency sinusoidal signal of 55 Hz, that is determined according to the desired seismic frequency band width needed to map the target of interest, formation to be mapped, depth of the target, lithology, etc. The methods of selecting the seismic frequencies to be generated and transmitted by the vibrators 10 and 11 are well understood and known in the art. The 10 and 11 units are physically located a few meters apart, and can be treated, for data acquisition and data processing purposes, as if they are at the same surface location. Both 10 and 11 are synchronized to start their transmissions of signal at the same time, the time durations of both the transmitted signals is also identical.

Both the seismic signals, mono-frequency seismic wave and the swept frequency wave propagate through the subsurface formations. As the two waves travel together in the subsurface formations that are elastically linear, the principle of superposition holds and there is no interaction between the two. However, when they travel through a formation that is elastically nonlinear, then a nonlinear interaction between the two elastic waves occurs, and summed and differenced frequencies are generated, which in this invention are used as a secondary seismic source of newly generated frequencies.

Surface arrays of seismic detectors or geophones are shown in FIG. 1 as 12, which can be deployed in a 2-D or 3-D configuration and may be hundreds of independently recorded seismic data channels, spaced in a predetermined geometry according to the practiced art of reflection seismic recording that is well known today. In addition, data can be simultaneously recorded using downhole array 15 in a wellbore 14, that is deployed from the surface and may have one hundred or more independent receiver outputs, with preselected vertical spacing. The downhole array could be part of a permanent installation in a wellbore to be used repeatedly to monitor the changes in the reservoir caused by secondary and tertiary recovery programs. More than one wellbore can be used with downhole receiver arrays to provide a 2-D or 3-D seismic image. Knowledge of such a deployment of surface seismic detector arrays and wellbore receivers is known in the industry; the equipment is available and the practices of data acquisition and data processing are well known.

The seismic recording equipment 13, known in the art, simultaneously records seismic data from surface detectors 12 and downhole receivers 15. For the sake of simplifying the concept of this invention, FIG. 1 shows a land data acquisition set-up, the same type of data acquisition can be carried out using marine vibratory sources and the detectors can be either a marine towed streamer or an ocean bottom cable. These recording procedures are being practiced today and are known in the art. This invention is not limited to seismic land operations only, and can be equally applied for marine seismic.

FIG. 1 shows the cross section of the earth, where 25 is a porous reservoir rock formation that may be a sand unit. The sand unit 25 is encased in a non-porous formation 26 that may be shale. The ray paths of the signals transmitted from 10 and 11 propagate through shale 26, and are shown by 16 and 21. Part of the signal traveling on ray path 16 is reflected from the interface, which is the top of 25, and travels on the reflected signal path 17, and is recorded by the receiver array 12.

The remainder of the signal 16 is transmitted as 18 through the upper interface of 25 and 26, travels through the formation 25 and is reflected at the bottom interface of 25, and is transmitted up as a reflected signal 19. The reflected signal 19 travels through the formation 25 and is transmitted across the interface of 25 and 26 as 20. The signal 20, which represents the reflected signal from the lower interface of 25 and 26, is recorded by the surface array 12.

The combined seismic signal traveling on ray path 21 is reflected at the top of 25 as 22 and transmitted as 23, then reflected again as 24. The reflected signals from the top and bottom of the sand formation 25 are 22 and 24 respectively, recorded by the downhole receiver array 15.

The signal paths 18,19, 23 and 24, travel through the sand formation 25 that is porous, fluid-saturated and elastically nonlinear. While the signal paths 16, 17, 21 and 22, travel through the shale formation 26 that is nonporous and can be treated as elastically linear.

During the passage of the two combined waves, through the elastically nonlinear formation 25, along the wave paths 18, 19, 23, and 24, there is a nonlinear interaction between the two waves. Due to this interaction, summed and differenced frequencies are generated. The newly generated frequencies in the elastically nonlinear rock act as a secondary seismic source. The newly generated, secondary source frequencies propagate along with the original signals and go through similar processes of reflection and transmnission, at different subsurface acoustic impedance boundaries. The surface array 12 and wellbore array 14 or both, record the primary signals and newly generated secondary signals that result from nonlinear interaction. These primary signals can be separated from the secondary signals by cross-correlation of the recorded data with the primary sweep. The secondary signals are separated from the recorded data by cross-correlation with the summed and differenced sweeps.

In contrast, the signal paths 16, 17, 21 and 22 are through a relatively linear rock, and there will be little or no interaction between the two waves.

FIG. 2 is a simple schematic that shows the sweep signal 27 transmitted by the surface source 10. For this example, the swept frequency is 10 Hz to 50 Hz; however, this could be any combination of frequencies, the selection of such frequencies is known in the art. The mono-frequency 28 is 55 Hz and transmitted by the second surface source 11. The summed frequency sweep 65 Hz to 105 Hz shown as 29, is the result of the wave interaction in the elastically nonlinear medium, where 55 Hz is added with the sweep frequencies 10 Hz to 50 Hz, thus generating a new swept frequency signal of 65 Hz to 105 Hz.

In the same manner, due to nonlinear interaction, differenced frequencies are generated as shown by 30. This is a second newly generated swept frequency signal of 45 Hz to 5 Hz. Both 29 and 30 signals travel through the formations 25 and 26 and are transmitted and reflected along with the primary wave signals 27 and 28. Using 29 and 30 as the pilot signals, for cross-correlating the data recorded by surface array 12 and wellbore array 14, two new data sets are generated that high light the reflected signals which result from the interaction of the two primary seismic waves 27 and 28 as they propagate through the nonlinear formation 25.

When the data received by arrays 12 and 15 and recorded by 13 are cross-correlated with 27, we get a conventional data set that is similar to that being used universally, for 2-D and 3-D seismic reflection recording, the methods of data acquisition and data processing are well known in the art. The same data, when cross-correlated with 29 and 30 represents the additional new information that has been generated due to elastic nonlinearity of the formation 25. So, in this invention we have developed a new method of mapping the subsurface formations that behave nonlinearly to the seismic wave propagation due to their porosity, fracturing, pore fluids and heterogeneity.

FIG. 3 shows three subsurface formations of a hydrocarbon reservoir. A and C are homogeneous, nonporous and elastically linear. B is heterogeneous, porous, and elastically nonlinear. 31 is the propagation path of the two seismic signals of two different frequencies F1 and F2. Part of the seismic signal 31, is transmitted and part of it is reflected at the interface of A and B formations. The reflected component of the signal is 32, and the transmitted component is 33. Signal 33 is further reflected and transmitted at the interface of B and C formations. The reflected signal is 34, which is transmitted upwards through the formation B, on its upward path to the surface. The frequency content of 31 and 32, is identical to F1 and F2, since there is no interaction between F1 and F2 seismic waves, and no new frequencies are generated, since the wave propagation is entirely through the elastically linear medium A. On the other hand, 33, 34, and 35 constitute new frequencies that are generated, by the nonlinear interaction between F1 and F2, since their propagation path is through an elastically nonlinear medium B. New summed and differenced frequencies are generated, so in addition to F1 and F2, we also have (F1+F2) and (F1−F2).

In this example, F1 is a swept frequency signal 10 Hz to 50 Hz, and F2 is a mono-frequency 55 Hz. Due to their interaction, new swept frequency signals 65 Hz to 105 Hz and 45 Hz to 5 Hz are generated These newly generated frequencies are present in 35, in addition to the original signals of 10 Hz to 50 Hz sweep and mono-frequency 55 Hz. The result of the cross-correlation of the recorded data by 13 with 65 Hz to 105 Hz sweep 29, and 45 Hz to 5 Hz sweep 30, identifies and separates the data with new frequencies that have been generated due to nonlinearity of the porous formation B. This newly generated data is separated and processed similar to the normal data that was generated by the cross correlation with 27, 10 Hz to 50 Hz sweep. Processing sequences, of cross-correlation and reflection mapping are known in the art.

The main contribution of this invention is to provide two additional set of seismic reflection maps, in addition to the conventional seismic maps that are available today in 2-D and 3-D, that display the reflections in time or in depth, a well known practice universally being applied today. The two additional sets of seismic reflection maps will be provided that will display the elastically nonlinear behavior of the subsurface formations. The nonlinear seismic reflection maps will be generated by seismic reflection processing the data that has been created after cross-correlation of the recorded data with the summed and differenced sweeps. The nonlinear seismic reflection maps will have newly generated frequencies, caused by the interaction of the two predetermined seismic signals as they propagate through elastically nonlinear formations. These nonlinear reflection maps will high light the formations that display nonlinearity due to their porosity, microfracturing and fluid content. The nonlinearity mapping is done in addition to the conventional seismic mapping that results from the cross-correlation of the data with the normal sweep 27.

The effects of elastic nonlinearity of the rocks, on the propagation of seismic signals in the subsurface reservoir formations, is a powerful seismic attribute that can be used to map the important reservoir characteristics like porosity, fracturing, pore fluids, etc.

These elastic nonlinearity effects can also be measured by measuring the second and third harmonics of the primary signal, in the reflected events. However, the nonlinear interaction of the two seismic waves is preferred due to its reliability, in comparison with harmonics, since harmonics can be generated by the source distortion created by the poor source coupling and other source effects.

Using a swept frequency signal and a mono-frequency signal is not intended to be a limitation. Both signals can be swept frequency signals, as long as the choice of frequencies is carefully selected to avoid source-generated harmonics.

DESCRIPTION OF AN ALTERNATIVE EMBODIMENT

The vibratory sources currently used in the industry are designed to provide a linear and low distortion output signal. Based on this criterion, the swept frequency signal 27 and the mono-frequency signal 28 can be generated simultaneously by the same vibratory unit. To generate the combined-signal, the amplitude summation of the two signals 27 and 28 is required, which is known in the art. This combined signal is used as a pilot signal, and transmitted into the earth by using a single vibratory unit, thus increasing the operational efficiency of the field operation. During processing, using cross correlation with 27 and the two sweeps 29 and 30, three sets of data are created as explained earlier in the description. These three sets of data are used for reflection imaging for normal 2-D and 3-D seismic and nonlinear seismic as explained earlier.

This invention provides us with a new method of recording seismic data from which two separate sets of data are created, one similar to conventional seismic recording practiced today and an additional set of data to map nonlinear properties of the earth. The major contribution of this invention is that the new data is acquired simultaneously with the conventional data, with no additional cost.

What is claimed is:

1. A method of mapping the reservoir rocks that exhibit elastic nonlinearity due to their porosity, fracturing, heterogeneity and pore fluids and distinguishing them from the rocks that are relatively linear due to lack of porosity, homogeneous rock structure and lower fluid content; mapping the porosity of the rocks by measuring the elastic nonlinearity of the subsurface reservoir formations; the nonlinearity measurements made by measuring the nonlinear interaction between the two selected seismic signals which propagate through those formations.

2. The method in claim 1 further comprising:

transmitting simultaneously from the same surface location into the earth, a first and a second selected seismic signals; both transmitted signals synchronized with each other with respect to start-time and duration-time; recording the seismic data that represents the reflected signals from the subsurface formation boundaries using arrays of surface detectors, wellbore receivers or both; seismic reflection data being recorded containing reflected information from both transmitted signals; reflected information recorded from signals transmitted by both seismic sources being superimposed on each other.

3. The method in claim 2 further comprising:

separating primary set of reflection data from the superimposed recorded data using cross-correlation with the second selected seismic signal and using it for 2-D or 3-D seismic processing; the 2-D or 3-D processing sequence and p processing flow for the primary reflection data selected to provide optimum image of the reservoir rocks; processing the determined parameters, which represent static and dynamic corrections due to the near surface conditions and complexity of the velocity model of subsurface being mapped.

4. The method in claim 3 further comprising:

computer generating two additional signals, the first additional signal generated by the frequency addition of the first selected seismic signal to the second selected seismic signal, and the second additional signal generated by the frequency subtraction of the first selected seismic signal from the second selected seismic signal, cross-correlating the recorded data with the two computer generated additional signals; in this manner recording two new sets of nonlinear seismic reflection data that have new frequencies, which are generated due to the nonlinearity of the earth formations as the first and second selected seismic signals interact during their propagation through the nonlinear subsurface formations.

5. The method in claim 4 further comprising:

processing said nonlinear seismic reflection data, which resulted after cross-correlation with the two computer generated additional signals for analyzing and imaging the elastically nonlinear rock formations; processing sequence and processing parameters for both sets of nonlinear seismic reflection data kept the same as determined by processing the primary reflection data for 2-D or 3-D seismic; coherent seismic reflection images represent subsurface rock formations, which exhibit elastically nonlinear properties; relative amplitudes and coherency of the 2-D or 3-D seismic reflection images in the processed results of nonlinear seismic data act as an indicator of the location and the level of nonlinearity of the reservoir rocks, which in turn relates to porosity.

* * * * *